United States Patent [19]

Lager et al.

[11] 4,178,483

[45] Dec. 11, 1979

[54] TIME-DIVISION SWITCHING TELEPHONE EXCHANGE COMPRISING A SERVICE SIGNAL SENDER

[75] Inventors: Jean P. Lager, La Celle St. Cloud; Jean P. Le Pabic, Rueil Malmaison; Jean C. Ledey, Boulogne, all of France

[73] Assignee: Le Material Telephonique, Boulogne-Billancourt, France

[21] Appl. No.: 837,697

[22] Filed: Sep. 29, 1977

[30] Foreign Application Priority Data

Oct. 5, 1976 [FR] France .............................. 76 29860

[51] Int. Cl.² ............................................. H04J 3/12
[52] U.S. Cl. ............................ 179/15 BY; 179/15 BS
[58] Field of Search ................. 179/6 C, 27 FG, 18 B, 179/15 AT, 15 A, 15 BY, 98, 15 BS

[56] References Cited

U.S. PATENT DOCUMENTS

| 3,435,149 | 3/1969 | Inose et al. ................. 179/15 BY X |
| 3,462,649 | 8/1969 | Stich ................................ 179/98 X |
| 3,755,630 | 8/1973 | Boyer ................................ 179/98 |
| 3,825,696 | 7/1974 | Long ............................... 179/15 A |
| 3,969,587 | 7/1976 | Calcagno ...................... 179/15 AT |
| 3,985,965 | 10/1976 | Field et al. ................... 179/15 BY |
| 3,997,727 | 12/1976 | Platts et al. .................. 179/15 AQ |
| 4,004,099 | 1/1977 | Jones et al. ................ 179/15 AT X |
| 4,068,099 | 1/1978 | Mikkola et al. ............... 179/15 AT |
| 4,069,399 | 1/1978 | Barrett et al. ............. 179/15 AT X |

FOREIGN PATENT DOCUMENTS 2256616 7/1975 France .............................. 179/15 AT Primary Examiner—Thomas W. Brown
Attorney, Agent, or Firm—Roland Plottel

[57] ABSTRACT

Disclosed is a device for sending a plurality of categories of signalling data over time-multiplexed channels, said device consisting of groups of circuits assigned to various categories of data wherein the inputs of each circuit are connected via a first common bus to the outputs of a clock circuit feeding time reference signals to the various channels, wherein the outputs of each circuit are connected via a second common bus to an output circuit. These groups of circuits are provided with a memory circuit for containing said data and a time reference signal decoding circuit for controlling the reading of the memory circuit for transmission of said data to a telephone exchange.

6 Claims, 8 Drawing Figures

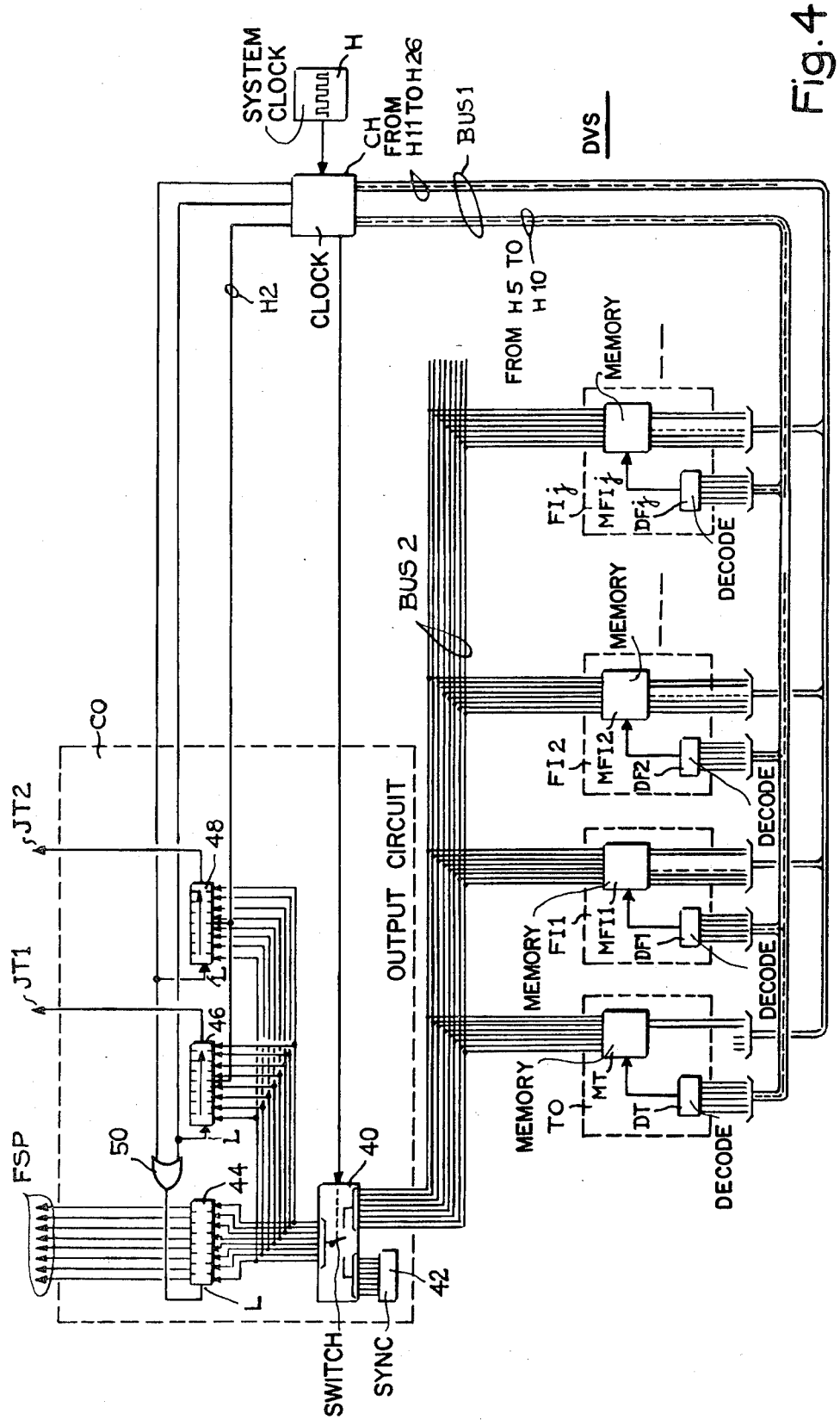

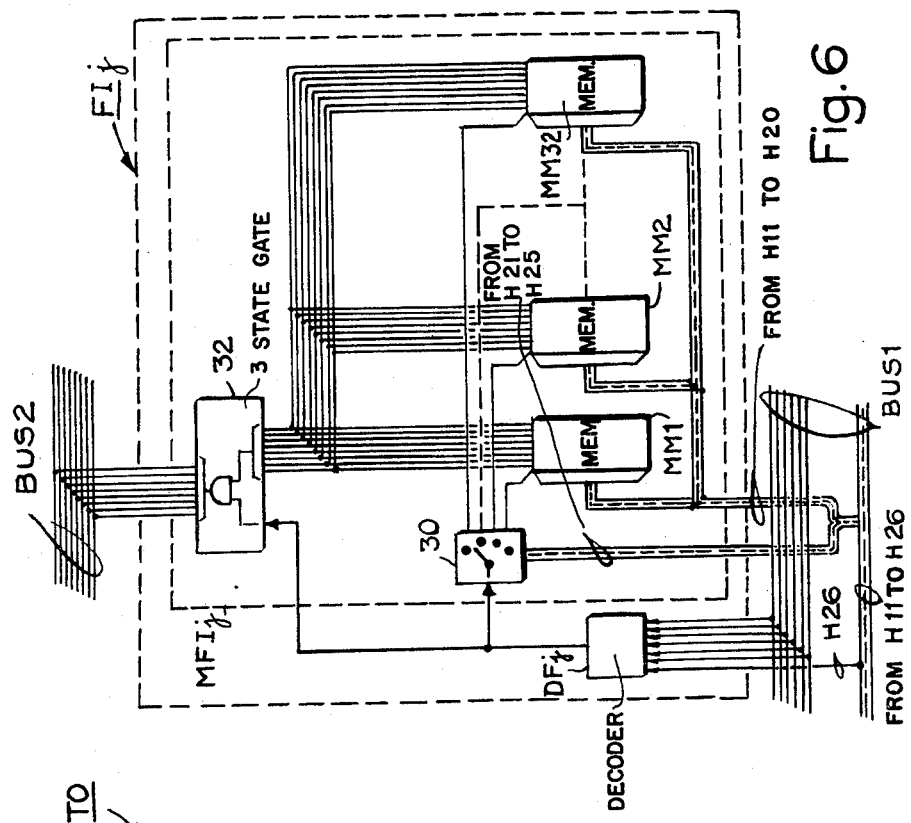
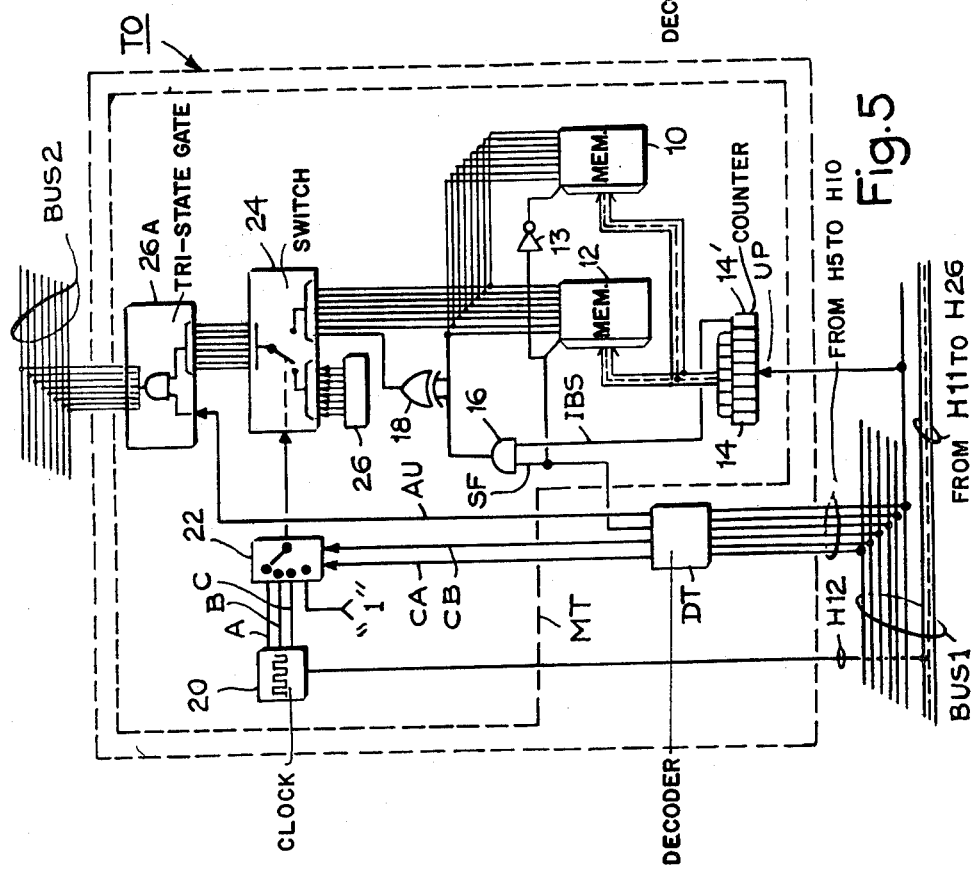

TIME-DIVISION SWITCHING TELEPHONE EXCHANGE COMPRISING A SERVICE SIGNAL SENDER

SUMMARY OF THE INVENTION

The present invention relates to a time-division switching telephone exchange possessing a service signal sender for conveying different categories of digital data over time-multiplexed channels.

The service signals concerned are the usual tones (dialling tone, routing tone, busy tone, ringing tone) and also speech signals of short messages indicating, for example, a changed called number to a caller.

During the life of an exchange, these signals are often changed. In particular, the contents of certain messages need to be changed while other messages need to be added and still other removed.

The present invention proposes a telephone exchange in which service signal modification is performed simply and without error.

For this purpose, a telephone exchange in accordance with the present invention is characterized whereby a service signal sender possesses groups of circuits each of which is assigned to one category of information, and the inputs of each circuit are connected via a first common line to the outputs of a clock feeding time reference signals to the various channels, and the outputs of each circuit are connected via a second common line to an output circuit, said group of circuits comprising a memory for containing the digital data and also a time reference signal decoder for controlling memory read operations.

It is another characteristic of the invention whereby each of said circuit groups is mounted on a support provided with connection means for connection to both said first common line and said second common line so as to easily facilitate even further modification of the circuits.

The following description together with the appended drawings, are presented as a non-limiting preferred embodiment to clearly illustrate the practice of the invention.

DESCRIPTION OF THE DRAWINGS

FIG. 4 shows the detail of a service signal sender.

FIG. 5 shows the detail of a group of tone circuits.

FIG. 6 shows the detail of a group of circuits assigned to message transmission.

DETAILED DESCRIPTION OF THE PREFERRED EMBODIMENT

The exchange described herein may be, for example, an exchange of the type described in the article by P. VOYER, K. KEVORKIAN and J. P. LAGER entitled "Reseau de connexion pour grands centres temporels" ("Switching Network for Large Time-Division Exchanges") published in the 49th issue of "Commutation et electronique" edited by SOCOTEL and dated April 1975. This exchange is very briefly illustrated in FIGS. 1 and 2. An English language publication on the same subject is U.S. Pat. No. 3,851,105.

It possesses incoming time-division switches CTE0, CTE1, . . . , CTEm, to which are connected the incoming junctions $JE_0^0$ to $JE_n^0$ for switch CTE0, junctions $JE_0^1$ to $JE_n^1$ for switch CTE1, and so on, up to junctions $JE_0^m$ to $JE_n^m$ for switch CTEm. The outputs of these incoming time-division switches are connected to the outgoing time-division switches CTS0 to CTSm via a space-division time-divided switching network designated RSP. The outgoing junctions $JS_0^0$ to $JS_n^0$ are connected to the output of switch CTS0, junctions $JS_0^1$ to $JS_n^1$ to the output of switch CTS1, and so on up to junctions $JS_0^m$ to $JS_n^m$ connected to the output of switch CTSm. The various elements of the exchange are synchronized by a clock H, and a processor CA produces the data for performing the various switching operations.

Figure 1:
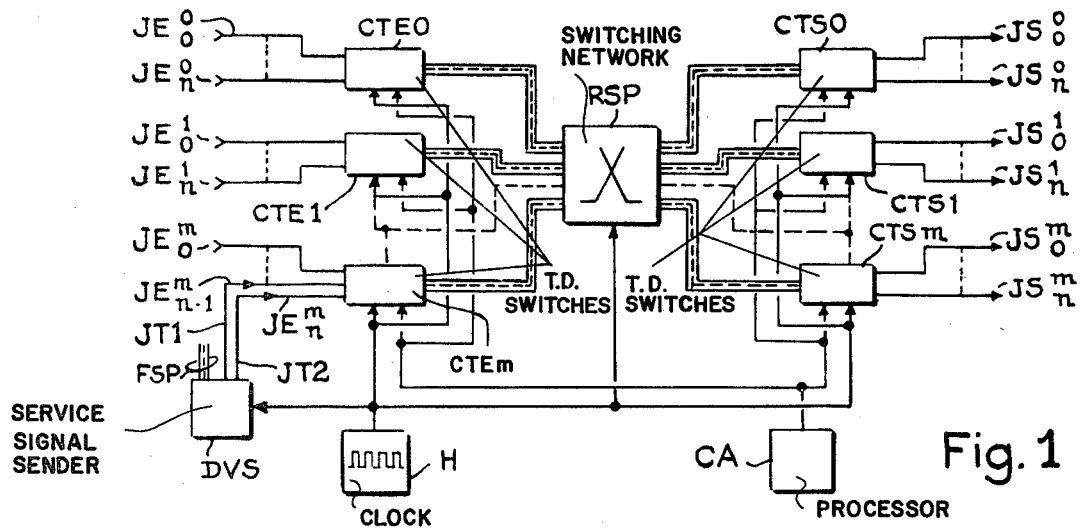
FIG. 1 shows an exchange in accordance with the invention, in which the service signal sender is connected invention, in which the service signal sender is connected to the incoming junctions.
Figure 2:
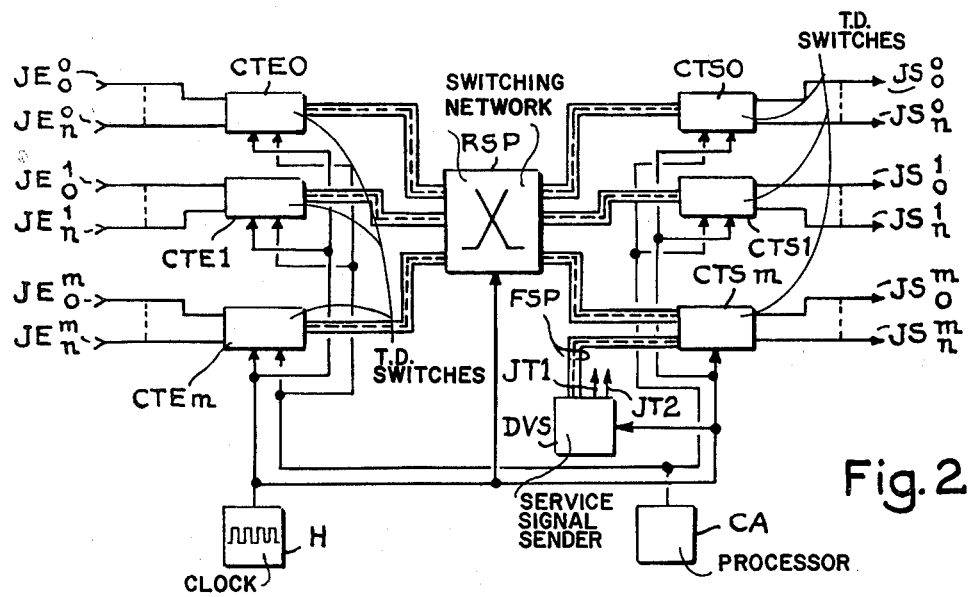
FIG. 2 shows an exchange in accordance with the invention, in which the service signal sender is connected to the outgoing time-division switches.

The service signal sender DVS produces various signals in the form of 8-bit samples. These signals are classified in categories. Amongst these categories, one relates to tones, while the others relate to various messages. Device DVS possesses two kinds of output: an 8-wire output FSP for sending 8-bit samples in parallel, and an output to the two junctions JT1 and JT2 for serial transmission of these samples. Device DVS can thus be connected in either of two manners. The first is shown in FIG. 1, the outgoing junctions JT1 and JT2 connecting to the incoming junctions $JE_{n-1}^m$ and $JE_n^m$. In the second manner, shown in FIG. 2, wires FSP are connected to the outgoing time-division switch CTSm, as explained in more detail below.

Junctions JT1 and JT2 are in conformity with the I.T.T.C.C. recommendation, enabling them to be connected to junctions $JE_{n-1}^m$ and $JE_n^m$.

Figure 3:
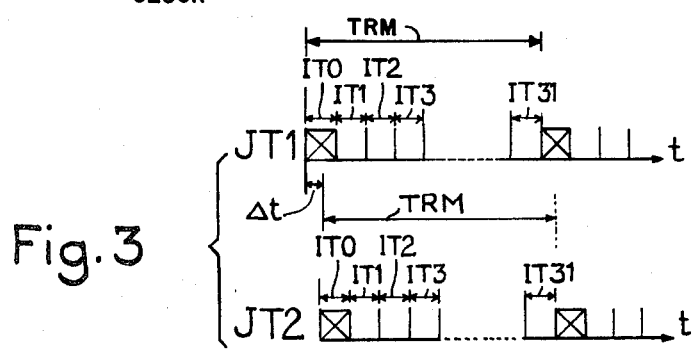
FIG. 3 shows a typical junction organization.

Junction organization is illustrated in FIG. 3. On junctions JT1 and JT2, a frame of multiplex TRM comprises thirty-two time intervals IT0, IT1, IT2, IT3, . . . , IT15, . . . , IT31, each having a duration of at least eight times the duration of one bit. Interval IT0 is used for transmitting a synchronization byte. The service signals are transmitted during the other intervals.

Each time interval occupying, in successive frames, the same place following interval IT0 defines a channel. The different time intervals IT1 thus define channel V1, intervals IT2 define channel V2, etc.

It is seen that the multiframes of junction JT1 are shifted by a time $\Delta t$ with respect to those of junction JT2. This shift $\Delta t$ is equal to four times the duration of a bit.

Table I indicates the assignments of the channels and junctions to the different signals.

TABLE I

| Junction | Channel | Type of Signal | Nature of Signal |
|---|---|---|---|
| | V1 | International tone | Continuous 850 Hz |
| | V2 | Dialling tone | Continuous 425 Hz |
| | V3 | Routing tone | 425 Hz for 50 ms followed by 50 ms of silence, and so on |
| JT1 | V4 | Busy tone | 425 Hz for 0.5 s followed by 0.5 s of silence, and so on |
| | V5 | Ringing tone | 425 Hz for 1.5 s |

TABLE I-continued

| Junction | Channel | Type of Signal | Nature of Signal |
|---|---|---|---|
| | V6 | Message n° 1 | followed by 3.5 s of silence, and so on Speech |
| | . | | |
| | . | | |
| | V1 | Message n° j | Speech |
| | . | | |
| | . | | |
| JT2 | Vk | Message n° j + k | Speech |

The digital samples sent in parallel over wires FSP appear in the same order as the samples sent serially to the two junctions. The following are thus obtained in succession on wires FSP:
the sample available on channel V1 of junction JT1
the sample available on channel V1 of junction JT2
the sample available on channel V2 of junction JT1
the sample available on channel V2 of junction JT2

In accordance with the invention, the service signal sender DSV illustrated in FIG. 4 comprises groups of circuits TO, FI1, FI2, ..., FIj, etc., of which each is assigned to an information category. Group TO produces all the tones, group FI1 produces message no. 1, group FI2 produces message no. 2, etc. The inputs of these groups are connected via a first common line BUS1 to the outputs of a clock CH feeding the time reference signals to the various channels while the outputs are connected via a second common line BUS2 to an output circuit CO. Groups TO, FI1, FI2, ..., FIj, etc., consist of memory circuits MT, MFI1, MFI2, ..., MFIj, etc., respectively for storing the digital data and also of time reference signal decoding circuits DT, DF1, DF2, ..., DFj, etc., for controlling the memory circuit read operation during the time intervals allocated to it.

In the present case, not more than sixty-two channels are used. Clock H produces the signal indicating the channel concerned on six wires H5 to H10 of BUS1. The numerical references of these wires correspond to the period of the signal transmitted by them. The signal on wire H5 has a period equal to eight times the duration of one bit, the signal on wire H6 has half this period, the signal on wire H7 has quarter of this period, and so on.

Table II indicates the samples obtained on the output of the sender as a function of the code applied to the six wires.

TABLE II

| Code | Samples on wires FSP | Samples on junction JT1 | Samples on junction JT2 |
|---|---|---|---|
| 00000 | International tone | International tone | — |
| 00001 | Message n° j | | Message n° j |
| 00010 | Dialling tone | Dialling tone | |
| 00011 | Message n° j + 1 | | Message n° j + 1 |
| 00100 | Routing tone | Routing tone | |
| 00101 | Message n° j + 2 | | Message n° j + 2 |
| 00110 | Busy tone | Busy tone | |
| 00111 | Message n° j + 3 | | Message n° j + 3 |
| 01000 | Ringing tone | Ringing tone | |
| ... | ... | ... | ... |

Thus when code "00000" is present on BUS1, it is recognized only by circuit DT, which activates memory circuit MT such that an international tone sample is transmitted over BUS2.

Code 00001 is recognized by decoding circuit DFj, such that a sample of message j is transmitted to BUS2.

Since all tones are considered as belonging to a single service signal category, codes "00000", "00010", "00100", "00110" and "01000" are recognized by the same decoding circuit DT, which activates in an appropriate manner circuit MT such that the correct samples are fed to BUS2. These different codes are transmitted at the rate imposed by clock H. Each code is present on BUS2 only for the period required for transmitting a half-byte serially. Operation of circuits MT, MFI1 and MFI2 require clocking signals which are multiples of those of the signals present on wires H5 to H10. These signals are thus generated by clock CH and applied to wires H11 to H26 of the common BUS1.

FIG. 5 shows in detail the constitution of circuit TO which feeds to BUS2 the samples representing the tones indicated above in Table I.

Among the tones are distinguished those at 425 Hz and that at 850 Hz. The samples representing an 850 Hz sinusoidal signal are stored in a memory 10 and those representing a 425 Hz sinusoidal signal in memory 12. Memories 10 and 12 are read-only memories containing 160 samples. They are read by means of a counter 14 counting up to 160. The count-up input of counter 14 is connected to wire H10 of BUS1 on which appears the most significant bit of the code produced by clock H, i.e. the contents of counter 14 change after a period equal to that of a frame TRM. Th byte obtained on the output of memories 10 and 12 is determined by a signal appearing on wire SF connected to the output of circuit DT. This wire is connected directly to the read-inhibit control of memory 12 and also via an inverter 13 to the read-inhibit control of memory 10. A logical "0" on wire SF thus enables a byte to be obtained from memory 12, while a logical "1" enables a byte to be obtained from memory 10.

The 160 samples contained in memory 12 represent 20 ms of 425 Hz tone, since the duration of a frame in accordance with the I.T.T.C.C. recommendation is 125 µs. It should be noted that 20 ms represents 8.5 signal periods. In order to allow connection of the 425 Hz signal after this 20 ms interval, it is necessary to change the sign of the samples obtained from memory 12 for 20 ms before returning to initial conditions. For this purpose, an additional stage 14' to counter 14 is provided. A signal thus appears on wire IBS connected to this stage for changing the logic level each time counter 14 has completed a count cycle. This wire IBS is connected to one of the two inputs of an AND gate 16, whose other input is connected to wire SF. The output of gate 16 is connected to one input of an exclusive OR gate 18, whose other input is connected to an output wire of memories 12 and 10. It is on this wire that appears the bit representing the sample sign. When signal SF is a logical "1", gate 16 is thus open such that if the signal present on wire IBS is a logical "1", the signal on the output of gate 18 will have a value different from that of the sign bit. If the signal present on wire IBS is a logical "0", this value will not be different. It is seen that the value of the sign bit appearing on the output of memory 10 is not changed, since in this case the signal on wire SF is a logical "0".

In order to modulate the 425 Hz signal in different ways (see Table I), a pulsing circuit 20 is provided, feeding as a function of the signal present on wire H12 the various periodic logic signals to wires A, B and C, whose periods are whole multiples of the signal on H12, i.e. multiples of 50 μs. On wire A, the signal remains a logical "1" for 50 ms, and a logical "0" for 50 ms. On wire B, the signal remains a logical "1" for 0.5 s, and a logical "0" for 3.5 s. A four-input switch 22 selects either one of the signals present on the three wires A, B and C, or a constant logical "1" signal. This switch is controlled by a code present on two wires CA and CB. When this code is "00", a permanent logical "1" is produced on the output of switch 22. If the code is "01", the switch connects wire A to its output. If the code is "10", it connects wire B to its output, and if the code is "11", it connects wire C to its output.

In turn, the signal on the output of switch 22 controls another switch 24. The byte appearing on the output of switch 24 is either the byte obtained from memory 10 or 12 with possible modification of the sign bit, or a predetermined byte produced by a circuit 26. This byte results in a silence when converted into an analogue signal. The silence byte appears on the output of switch 24 when the control signal is a logical "0". When the signal on wire AU is a logical "1", a 3-state gate 26A feeds the byte selected on the output of switch 24 to BUS2.

Decoding circuit DT consists of a read-only memory which is easy to program as a result of that described above. Table III below shows the correspondence between the input code available on BUS1 and the signals on wires CA, CB, AU and SF.

TABLE III

| Code on BUS1 | Signal on wire CA | Signal on wire CB | Signal on wire AU | Signal on wire SF |
|---|---|---|---|---|
| 00000 | 0 | 0 | 1 | 1 |
| 00001 | X | X | 0 | X |
| 00010 | 0 | 0 | 1 | 0 |
| 00011 | X | X | 0 | X |
| 00100 | 0 | 1 | 1 | 0 |
| 00101 | X | X | 0 | X |
| 00110 | 1 | 0 | 1 | 0 |
| 00111 | X | X | 0 | X |
| 01000 | 1 | 1 | 1 | 0 |
| ... | ... | ... | ... | ... |

Symbol X in Table III indicates that the signal may be either a logical "1" or a logical "0" without disturbing the operation of the circuit.

FIG. 6 shows circuits FIj in detail. This group comprises circuit MFIj consisting of a device, described in the French patent No. 2 288 430, which device is connected to the output of circuit DFj. Circuit MFIj possesses thirty-two read-only memories MM1, MM2, . . . , MM32, each possessing 1024 8-bit words. These memories are addressed by a code available on wires H11 to H20 of BUS1. Since all the outputs of these memories are connected together, the output byte of one of these memories is selected by a signal appearing on one of the thirty-two outputs of a switch 30. This switch is controlled by the signals available on wires H21 to H25. The input of switch 30 is connected to the output of circuit DFj. The byte selected from one of these memories is fed to BUS2 by means of a 3-state gate 32 validated by the output signal of circuit DFj.

If the message is too long, two groups are needed to accomplish this. Circuits DFj relating to the same long message possess an additional input connected to wire H26, such that when the signal on the wire is a logical "0", one group is selected, and once all the bytes have been read, the signal on H26 changes to a logical "1", selecting a second group.

The bytes present on BUS2 before being transmitted to wires FSP or junctions JT1 and JT2 are processed by circuit CO shown in FIG. 4. This circuit firstly comprises a 2-input, 8-wire switch 40. One of these inputs is connected to BUS2, while the other is connected to the outputs of a circuit 42 designed to produce the synchronization word in accordance with the I.T.T.C.C. recommendation. The 8-wire output of the switch is connected to the parallel inputs of three registers. The first designated 44 is a parallel-to-parallel register, whose outputs are connected to wires FSP. The second and third, designated 46 and 48 respectively, are shift registers, whose serial outputs are connected to junctions JT1 and JT2 respectively. The shift signals are produced by clock H. The frequency of these signals is equal to the reciprocal of bit duration. The load signals of registers 46 and 48 are also produced by clock H. These signals are active following production of the eighth bit. They appear alternatively on the load inputs L of registers 46 and 48. These load signals are also fed to an OR gate 50, whose output is connected to the load input L of register 44, such that this register 44 is loaded at twice the rate of registers 46 and 48.

Figure 7:
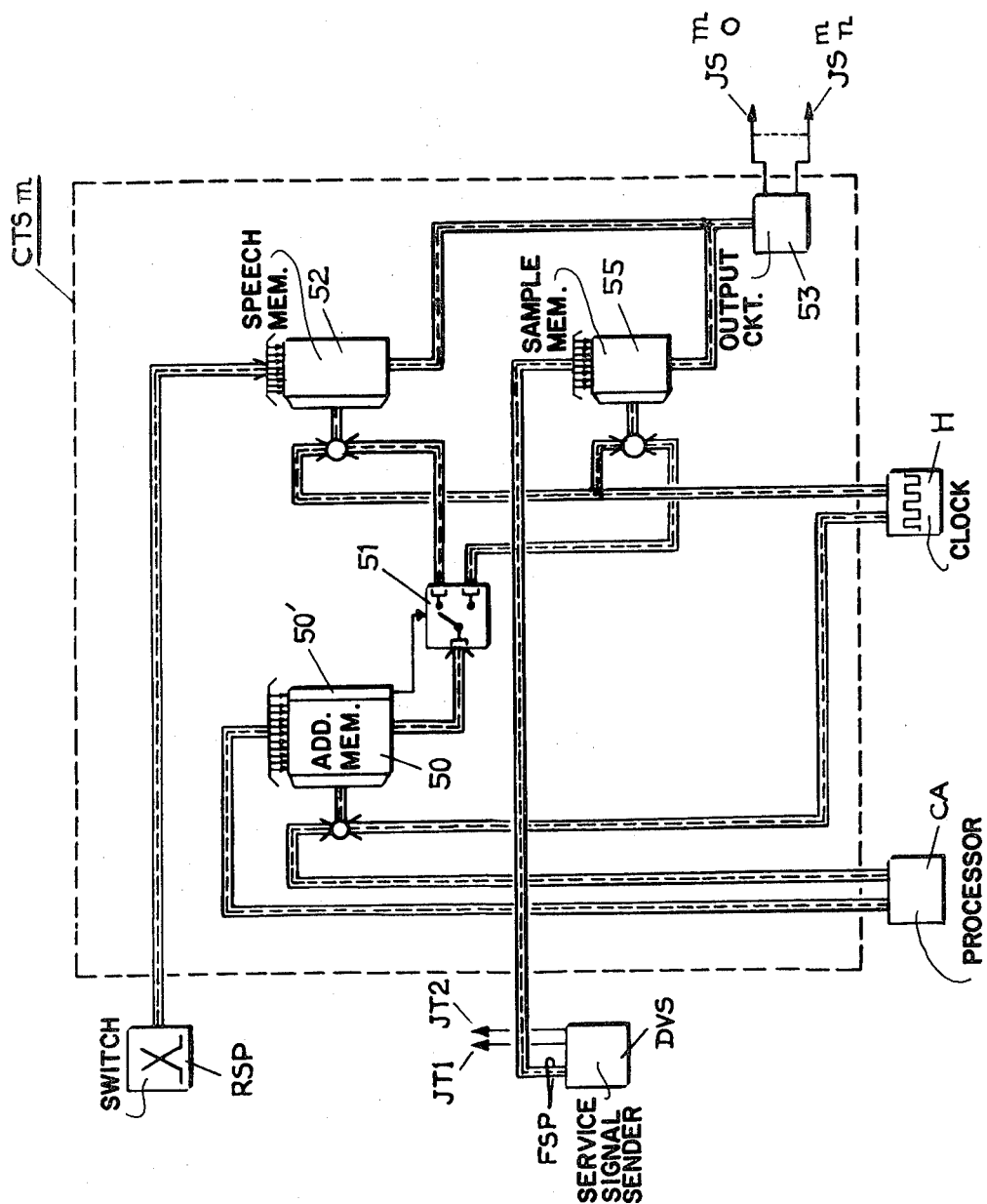
FIG. 7 shows the constitution of an outgoing time-division switch suitable for connection to a service signal sender.

FIG. 7 shows in detail the manner in which circuit DVS is connected to an outgoing time-division switch CTSm. The switch shown in this figure has been described in U.S. Pat. No. 3,937,935.

This switch possesses an addressing memory 50 for containing the data obtained from the processor CA and stored in a location indicated by the latter. This memory is read cyclically, for which clock H feeds memory 50 with a succession of read address codes. The data obtained from this memory are used via an address code switch 51 for addressing a second memory 52, known as the speech memory. This speech memory contains the digital samples which have passed through network RSP. These samples are stored in succession in this memory by means of address codes generated by clock CH. They are then distributed to junctions $JS_0{}^m$ to $JS_n{}^m$ by output circuit 53.

In order to connect device DVS to this switch, the present invention proposes an additional memory 55 for recording the various samples produced on wires FSP. These samples are stored in this memory by means of an address code produced by clock CH. In addition, memory 50 has been extended by a column 50', such that the latter contains an additional bit per memory line. This bit determined at the level of processor CA controls switch 51. The code obtained from memory 50 is then used either for addressing memory 52 or addressing memory 55.

Figure 8:
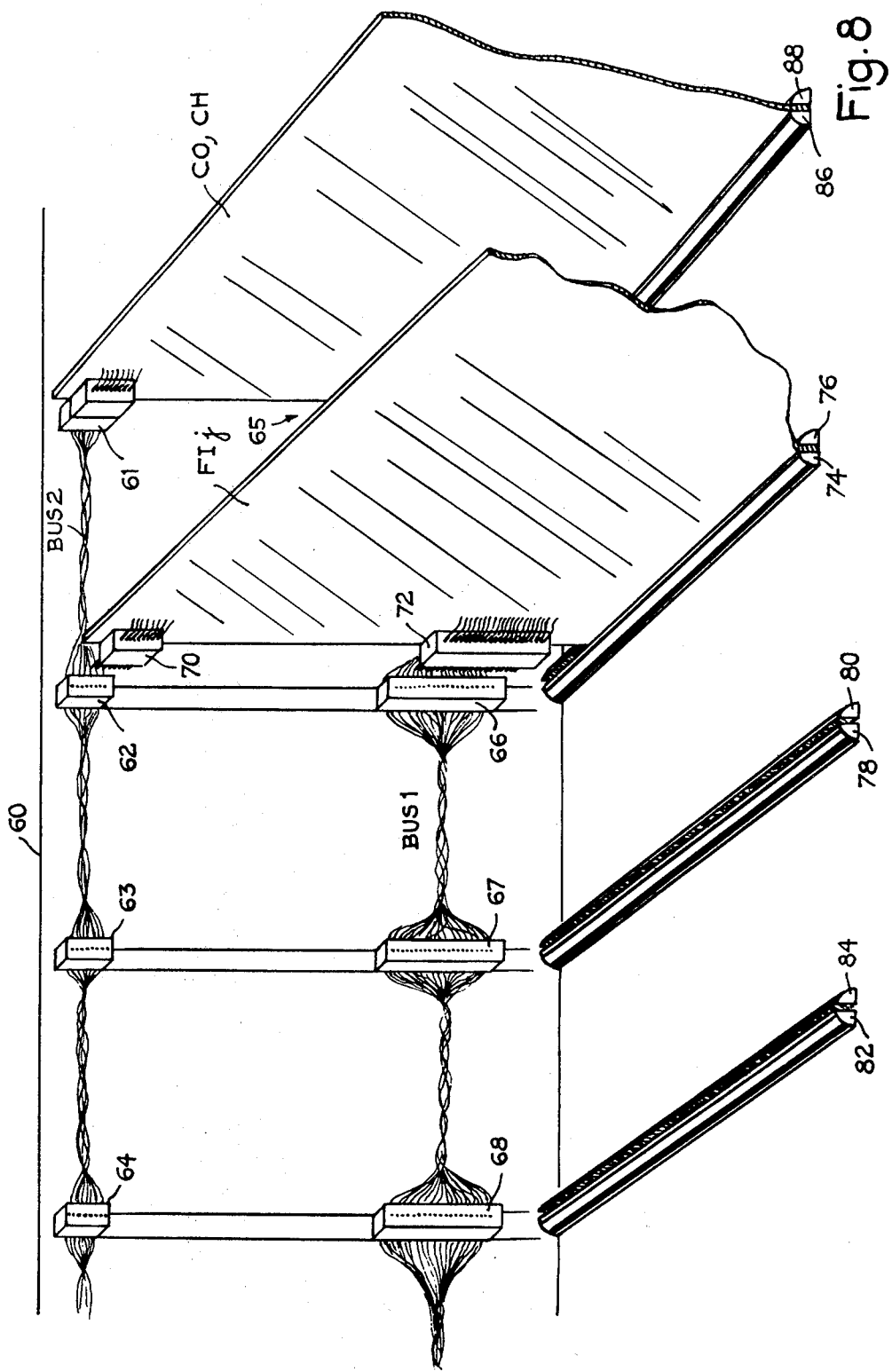
FIG. 8 shows the construction of a service signal sender.

FIG. 8 shows how the service signal sender can be provided in practice on the rear 60 of a frame. Various sockets 61, 62, 63, and 64 are placed in one row, while connectors 65 (not visible in the figure), 66, 67, and 68 are arranged in another row. Each of connectors 61, 62, 63, and 64 is connected to BUS2, while each of connectors 65, 66, 67, and 68 is connected to BUS1. Each of the groups FIj or TO is mounted on a printed-circuit board. This figure shows only the board on which is mounted group FIj. Similarly, pairs of slides are associated with pairs of connectors such as slides 78 and 80 with connectors 63 and 67. Similarly, pairs of slides 78 and 80, 82, and 84, and 86 and 88 provided opposite connectors 63 and 67, 64 and 68, and 61 and 65 respectively. Each of said pairs of slides is capable of mounting a circuit board carrying a circuit TO or FI1 . . . , FIj.

A board carrying circuits CO and CH is inserted into slides 86 and 88. The location of this board is at a terminal end of frame 60. It is connected to the remainder of the exchange by connectors not shown. The board carrying circuits FIj, however, can be inserted into slides 74 and 76, plugging connectors 70 and 72 into connectors 62 and 66 (as shown in FIG. 8), or into slides 78 and 80, such that connectors 70 and 72 plug into connectors 63 and 67, or again into slides 82 and 84, such that connectors 70 and 72 plug into connectors 64 and 68.

Although the principles of the present invention are described above in relation to a specific practical example, it should be clearly understood that the description is given as an example only and does not limit the scope of the invention as defined by the claims appended hereinafter.

What is claimed is:

1. A telephone exchange comprising: a time-division switching network synchronized by means of a clock and controlled by means of a processor; and
   a service signal sender for transmitting PCM encoded service signals, such as speech signals comprising short, recurrent messages or signal tones, over the time-multiplexed outgoing junctions of said time-division switching network, said PCM encoded signals originating from a plurality of generating circuits each having at least one read-only memory cyclically read under control of a counter activated by said clock, wherein the service signal sender comprises:
   clock means for receiving and transmitting synchronization signals from the said clock and for generating, from said synchronization signals, time reference signals each comprising the combination of an output number for said service signal sender, a generating circuit number, a frame number and a channel number;
   decoding means for receiving incomplete time reference signals and for selectively enabling the data outputs of said generating circuits and of said read-only memories; and
   output means for receiving incomplete time reference signals and synchronization signals from said clock and for selectively enabling the injection of data outputs from said generating means into said switching network.

2. A telephone exchange comprising:
   a time-space-time switching network synchronized by means of a clock and controlled by means of a processor; and
   a service signal sender for transmitting PCM encoded service signals, such as speech signals comprising short recurrent messages or signal tones, over the time-multiplexed outgoing junctions of said switching-network, said switching network having incoming time-switches connected through space switches to outgoing time-switches, each time-switch having a speech memory for storing the data to be switched and an addressing memory containing addressing data produced by the processor controlling the exchange, to read the speech memory, said PCM encoded service signals originating from a plurality of generating circuits each having at least one read-only memory cyclically read under control of a counter activated by said clock, wherein said signal sender comprises:
   clock means for receiving and transmitting synchronization signals from said clock and for generating time reference signals from said synchronization signals, each time reference signal comprising the combination of an output number for said service signal sender, a generating circuit number, a frame number and a channel number;
   decoding means for receiving incomplete time reference signals and for selectively enabling the data outputs of said generating circuits and of said read-only memories in said generating circuits;
   output means for receiving synchronization signals from the clock means and for selectively enabling the parallel injection of data outputs of said generating means in an additional memory of any one of said outgoing time-switches.

3. A telephone exchange in accordance with claim 2, wherein the service signal sender further comprises:
   a parallel output register connected to the data outputs of said generating circuits and to the synchronization signal outputs of said clock; and
   an additional memory in each outgoing time-switch, said additional memory being connected to the data outputs of said parallel output register and to the address outputs of the addressing memory of the corresponding outgoing time-switch.

4. A telephone exchange comprising:
   a time-space-time switching network synchronized by means of a clock and controlled by means of a processor; and
   a service signal sender for transmitting PCM encoded service signals, such as speech signals comprising short messages and signal tones, over the time-multiplexed outgoing junctions of said switching network, said switching network having incoming time-switches connected through space-switches to outgoing time-switches, each incoming time-switch having a speech memory for storing the data to be switched and incoming junctions connected to the data inputs of said speech memory, said PCM encoded service signals originating in a plurality of generating circuits each having at least one read-only memory cyclically read under control of a counter activated by said clock, wherein said service signal sender comprises:
   clock means for receiving and transmitting synchronization signals from said clock and for generating time reference signals from said synchronization signals, each time reference signal comprising the combination of an output number for said service signal sender, a generating circuit number, a frame number and a channel number;
   decoding means for receiving incomplete time reference signals and for selectively enabling the data outputs of said generating circuits and of said read-only memories in said generating circuits; and
   output means for receiving incomplete time reference signals and synchronization signals from said clock and for selectively enabling the serial injection of data outputs from said generating means into the speech memory of an incoming time-switch.

5. A telephone exchange comprising:
   a time divison switching network synchronized by means of a clock and controlled by means of a processor; and
   a service signal sender for transmitting PCM encoded service signals, such as speech signals comprising short, recurrent messages or signal tones, over the time-multiplexed outgoing junctions of said time-division switching network, said PCM encoded signals originating from a plurality of generating circuits each having at least one read-only memory cyclically read under control of a counter activated by said clock through a clock circuit, wherein the tone generating portion of said service signal sender comprises:

a read-only memory for each desired tone frequency, said memory memorizing the successive samples needed to reproduce said frequency, each memory being connected to a specific output of a decoder means and to one specific synchronization output of said clock via an addressing counter;

a read-only register memorizing a sample corresponding to silence;

a modulation switch connected to the respective outputs of said read only register and each of said read-only memories, and controlled by said clock through a logical arrangement for selecting a byte representative of one of said signal tones in accordance with the timing given by said clock circuit.

6. A telephone exchange according to claim 5, wherein said logical arrangement comprises an inverter for inverting the data of a byte at the output of a particular read-only memory, in accordance with the timing given by said clock.

* * * * *